Oct. 18, 1966 D. H. CAMPBELL 3,279,728
ELECTRICAL CONTROL PANEL MOUNTING PLATE
Filed Feb. 20, 1964 2 Sheets-Sheet 1

INVENTOR.
DUDLEY H. CAMPBELL
BY
Brown, Critchlow, Flick & Peckham.
ATTORNEYS.

Oct. 18, 1966  D. H. CAMPBELL  3,279,728
ELECTRICAL CONTROL PANEL MOUNTING PLATE
Filed Feb. 20, 1964  2 Sheets-Sheet 2

INVENTOR.
DUDLEY H. CAMPBELL
BY
Brown, Critchlow, Flick & Peckham.
ATTORNEYS.

United States Patent Office 3,279,728
Patented Oct. 18, 1966

3,279,728
ELECTRICAL CONTROL PANEL MOUNTING PLATE
Dudley H. Campbell, St. Marys, Pa., assignor to Stackpole Carbon Company, St. Marys, Pa., a corporation of Pennsylvania
Filed Feb. 20, 1964, Ser. No. 346,304
3 Claims. (Cl. 248—27)

This invention relates to the mounting plates by which electrical controls are attached to panels, and more particularly, to the means for fastening the plates in place.

It is common practice to fasten an electrical control, such as a switch or volume control, to a mounting plate by which the unit can be fastened to a panel in a radio, television set, or the like. Generally, the mounting plates are made of metal and provided with lugs projecting parallel to the control shaft for insertion in slots in the panel. After insertion, the lugs are twisted to hold the plate tightly against the panel. It has been proposed to make the mounting plates from a synthetic plastic, such as nylon, but that precludes the use of twistable fastening lugs.

It is among the objects of this invention to provide a mounting plate which is made of a plastic, which can be attached to a panel by a simple twisting motion, which will lock itself in place, which will maintain itself firmly against the panel, but which can be removed when necessary.

In accordance with this invention, a panel is provided with a control shaft opening and a pair of arcuate slots at opposite sides of the opening. There is a hole beside the opening between the slots. A plastic mounting plate for an electrical control has a front side for engagement with one side of the panel and it also has a control shaft opening that can be aligned with the panel opening. The plate has a pair of integral L-shape portions insertable through the panel slots and adapted to tightly engage the opposite side of the panel when the plate is twisted to connect it to the panel. The plate also has a locking pin portion projecting slightly beyond its front side for engagement with the panel. At least some of the plate is resilient to permit the L-shape portions to engage the opposite side of the panel while the pin portion slides against the plate side of the panel during twisting of the plate. The panel hole lies in the path of the sliding pin portion to receive it when the plate has been twisted in a predetermined amount, whereby the mounting plate is locked against accidental turning in the direction that would loosen it.

The invention is illustrated in the accompanying drawings, in which

Figure 1:
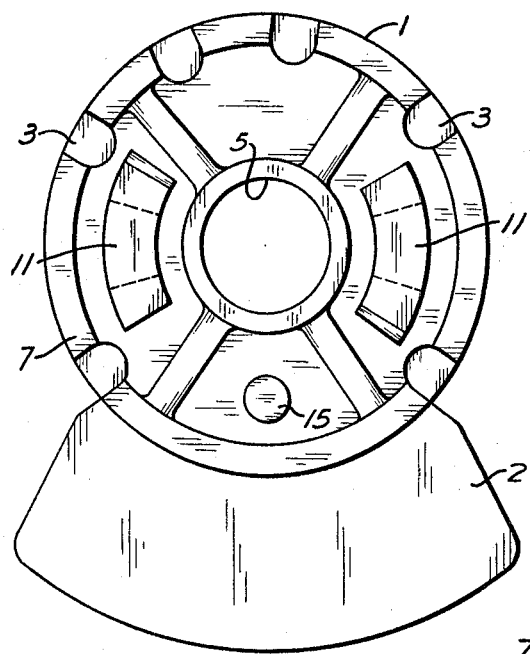
Figure 2:
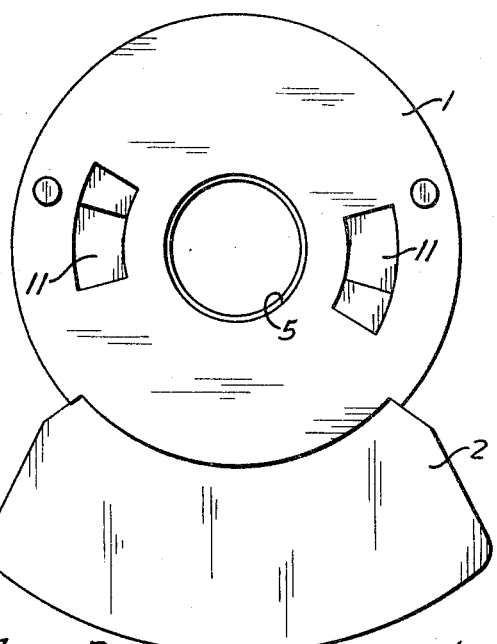
Figure 4:
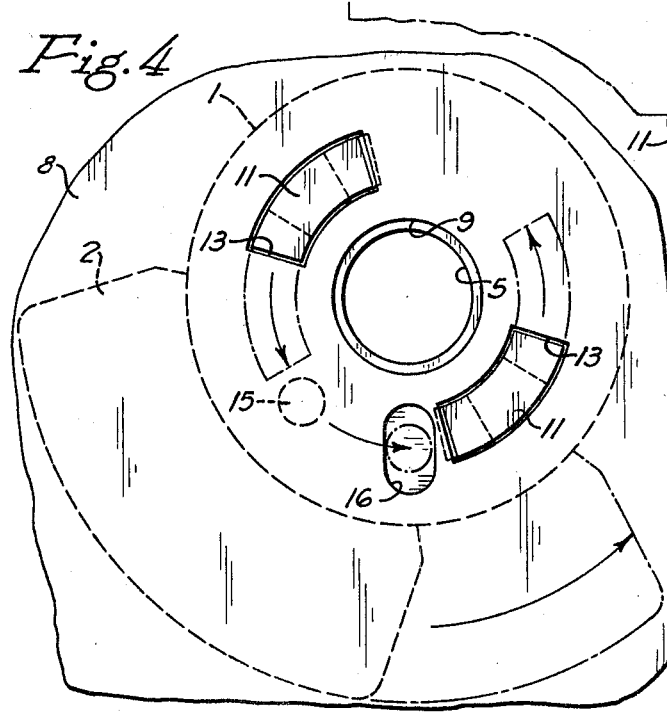
Figure 3:
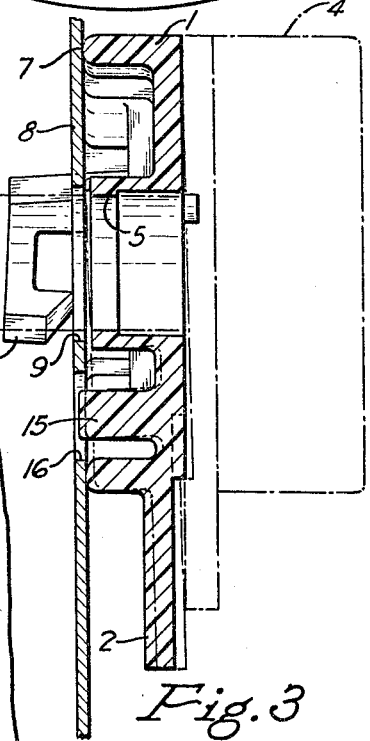
Figure 5:
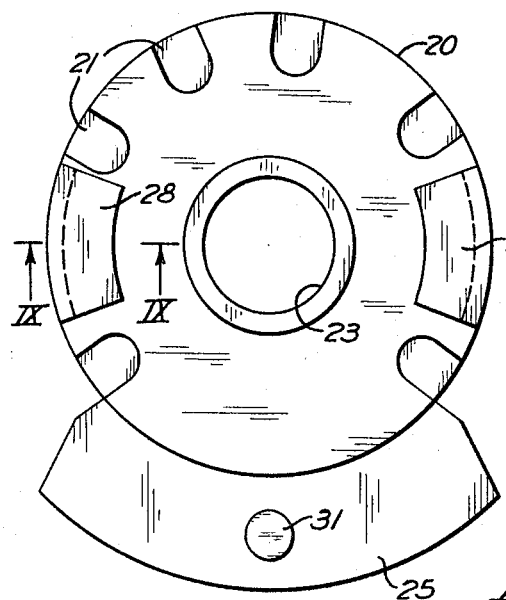
Figure 6:
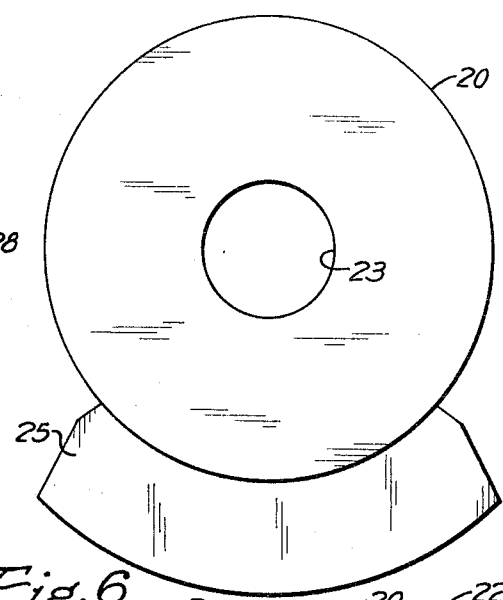
Figure 9:
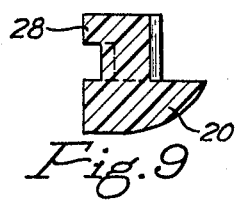
Figure 7:
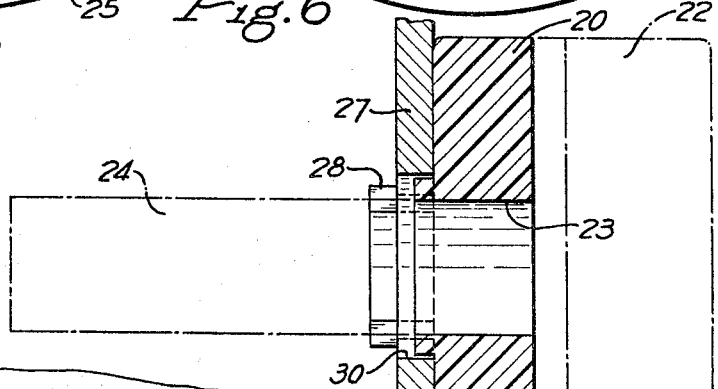

FIG. 1 is a front view of my mounting plate;
FIG. 2 is a rear view;
FIG. 3 is a central vertical section through the plate, showing it attached to a panel;
FIG. 4 is a view of the panel with the mounting plate behind it, showing the position of the plate when first applied to the panel before being twisted into final position;
FIGS. 5, 6, 7 and 8 are views of a modification corresponding, respectively, to FIGS. 1 through 4, and
FIG. 9 is a fragmentary horizontal section taken on the line IX—IX of FIG. 5.

Referring to FIGURES 1 through 3 of the drawings, the mounting plate is molded from a suitable synthetic plastic, such as nylon, having some resiliency. The plate has a circular body 1 and a radial fin 2. The side wall of the body is provided with a number of notches 3 for receiving the usual metal lugs (not shown) by which the metal housing of an electrical control, such as a switch or volume control 4 shown in dotted lines in FIG. 3, is clamped to a mounting plate. The center of the body has an opening 5 through it to receive the control shaft 6, also indicated in dotted lines in FIG. 4. The front side of the mounting plate is provided with a circular surface for engagement with one side of a mounting panel 8 around an opening 9 therethrough aligned with the central opening in the mounting plate.

Projecting forward from the front of the mounting plate body is a pair of diametrically opposite lugs 11 spaced equidistantly from the center of the plate. Each of these lugs is L-shape. That is, the lug extends forward a short distance from the body of the plate and then has a leg that normally extends more or less parallel to the plate. The free end of the lug is turned back toward the plate and is bevelled. The lug legs are arcuate lengthwise and extend in the same direction a short distance around the shaft opening 9 in the plate.

The mounting plate is applied to its supporting panel 8 by inserting lugs 11 through a pair of arcuate slots 13 in the panel as shown in FIG. 4. The plate then is rotated or twisted clockwise to cause the bevelled free ends of the lugs to slide onto and along the face of the panel at the ends of the slots until the plate can be turned no further. In this manner the panel becomes clamped between the front of the mounting plate and the outer ends of its lugs.

Another feature of this invention is that when the mounting plate is twisted into final position on the panel, the plate becomes automatically locked in place by a pin on the plate snapping into a hole into the panel. For this purpose, the mounting plate is provided with an integral pin 15 that projects forward slightly beyond its front side. The pin is located at one side of the central opening in the plate, between the adjacent ends of the lugs. The hole 16 in the panel that receives the pin is in such a position that the pin can not enter it until the mounting plate has been twisted into final position. Since the pin projects beyond the front of the plate, it will prevent the plate from resting flat against the panel until the pin projects into the hole 16. This causes no trouble because the L-shape lugs 11 will give or flex sufficiently to allow the mounting plate to be tilted by the pin relative to the panel while the pin is sliding against the panel during twisting of the mounting plate toward final position. As soon as the pin reaches panel hole 16, it will slip or snap into the hole as the resilient lugs pull the plate tightly flat against the back of the panel. The mounting plate then cannot be turned in a reverse direction to remove it from the panel until the pin is removed from the panel hole. That can be done, when necessary, by tilting the plate away from the panel to withdraw the pin from the hole, and then turning the plate in the reverse direction until the lugs can be withdrawn from the panel slots.

In the modification shown in the remaining figures of the drawings a mounting plate made from nylon or a similar resilient plastic has a circular body 20, the front of which is provided with circumferentially spaced notches 21 for receiving the attaching lugs of the metal housing of a volume control 22 or the like. The center of the body has an opening 23 through it that receives the control shaft 24. Projecting radially from one side of the body is a fin 25. In order to attach the mounting plate to a supporting panel 27, the body 20 is provided at opposite sides of its central opening with a pair of L-shape lugs 28, with the outer end of each lug extending radially outward. The panel is provided with a pair of arcuate slots 29 for receiving the lugs, and with an opening 30 for shaft 24.

Figure 8:
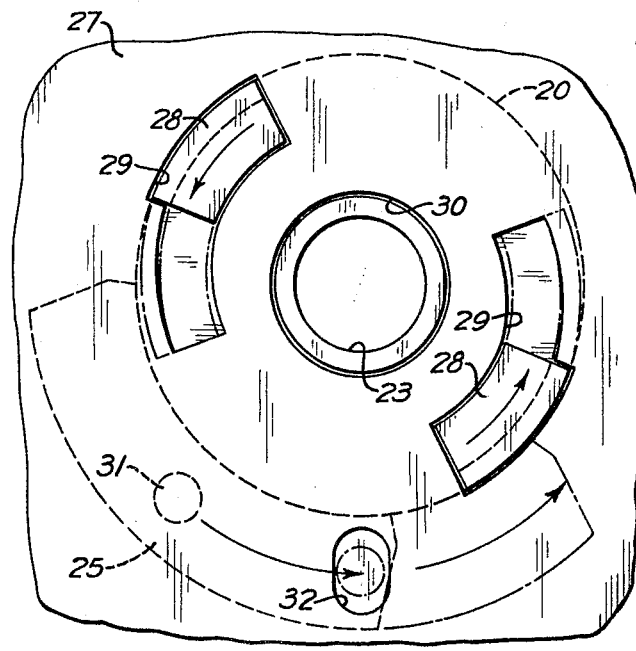

Each of the slots has a wide end portion and a narrow end portion, as shown in FIG. 8. The wide end portions permit the lugs to be inserted through the panel, whereupon the mounting plate can be turned to move the lugs into the narrow end portions of the slots where their outer ends will overlie the front of the panel to hold the mounting plate against the opposite side of the panel. To help hold the mounting plate firmly in place, it is preferred that the narrow end portions of the panel slots be positioned slightly eccentrically to the normal path of movement of the lugs as the plate is twisted. This will compel one side of each lug to press tightly against one side of the narrow end portion of the particular slot containing the lug.

Like the mounting plate first described herein, this modified plate is automatically locked in place when it has been turned into final position on the panel. This is done by a locking pin 31 that projects from the fin 25 and snaps into a hole 32 in the panel. The pin extends slightly beyond the front plane of the circular body of the mounting plate, but this does not interfere with attaching the plate to the panel because when the plate is pressed flat against the panel with lugs 28 extending through the panel slots, engagement of the pin with the panel will spring the fin backward at an angle to the circular body of the plate. Then, as the mounting plate is twisted clockwise to move the lugs toward the narrow ends of the slots, the pin will slide against the panel until it can be snapped forward by the resilient fin into panel hole 32. The mounting plate thereby is locked in place and cannot be turned unless the fin is voluntarily bent back to withdraw the pin from the hole in the panel.

I claim:

1. In combination, a panel provided with a control shaft opening and a pair of arcuate slots at opposite sides of the opening and a hole beside said opening between the slots, each of the slots having a wide end portion and a narrow end portion, and an electrical control plastic mounting plate having a circular body with a resilient fin projecting radially therefrom, said body having a front side formed for engagement with one side of the panel and having a control shaft opening, said body having a pair of L-shape lugs insertible through the wide end portions of said slots, the outer end of each lug extending radially outward and adapted to overlie the opposite side of the panel beside the narrow end of a slot when the plate is twisted to connect it to the panel, and the plate fin having a locking pin projecting slightly beyond said front side for engagement with the panel, said fin being bendable away from the panel to permit said lugs to overlie the opposite side of the panel while said pin slides against said one side during twisting of the plate, and said panel hole lying in the path of the sliding pin to receive it when the plate has been twisted a predetermined amount.

2. In the combination recited in claim 1, said wide end portions of the slots being positioned to freely receive said lugs, but said narrow end portions of the slots being positioned eccentrically to the normal path of movement of the lugs as the plate is twisted, whereby one side of each lug will press tightly against one side of the narrow end portion of the slot containing it.

3. In combination, a panel provided with a control shaft opening and a pair of arcuate slots at opposite sides of the opening and a hole beside said opening between the slots, each of the slots having a wide end portion and a narrow end portion, and an electrical control plastic mounting plate having a control shaft opening therethrough and having a body with a front side formed for engagement with one side of the panel, said body having a pair of L-shaped lugs insertible through the wide end portions of said slots, the outer end of each lug extending laterally and adapted to overlie the opposite side of the panel beside the narrow end of a slot when the plate is twisted to connect it to the panel, a locking pin projecting slightly beyond said front side of said body for engagement with the panel, said plate being provided with a resilient portion supporting the pin and bendable away from the panel to permit said lugs to overlie the opposite side of the panel while said pin slides against said one side during twisting of the plate, and said panel hole lying in the path of the sliding pin to receive it when the plate has been twisted a predetermined amount.

References Cited by the Examiner
UNITED STATES PATENTS 1,646,808   10/1927   Benjamin.
2,884,609   4/1959    Fraser _____ 339—126 X LEWIS H. MYERS, *Primary Examiner.*

H. W. COLLINS, *Assistant Examiner.*